United States Patent
Hansen et al.

(10) Patent No.: US 11,046,494 B2
(45) Date of Patent: Jun. 29, 2021

(54) FITMENT WITH PROPYLENE-BASED BLEND COMPONENT AND FLEXIBLE CONTAINER WITH SAME

(71) Applicant: Dow Global Technologies LLC, Midland, MI (US)

(72) Inventors: Sydney E. Hansen, Houston, TX (US); Mustafa Bilgen, Manvel, TX (US)

(73) Assignee: Dow Global Technologies LLC, Midland, MI (US)

(*) Notice: Subject to any disclaimer, the term of this patent is extended or adjusted under 35 U.S.C. 154(b) by 108 days.

(21) Appl. No.: 16/332,893

(22) PCT Filed: Sep. 26, 2017

(86) PCT No.: PCT/US2017/053405
§ 371 (c)(1),
(2) Date: Mar. 13, 2019

(87) PCT Pub. No.: WO2018/064027
PCT Pub. Date: Apr. 5, 2018

(65) Prior Publication Data
US 2019/0256268 A1 Aug. 22, 2019

Related U.S. Application Data

(60) Provisional application No. 62/400,326, filed on Sep. 27, 2016.

(51) Int. Cl.
| | | |
|---|---|---|
| B65D 75/58 | (2006.01) | |
| B32B 1/02 | (2006.01) | |
| B32B 1/08 | (2006.01) | |
| B65D 77/06 | (2006.01) | |

(Continued)

(52) U.S. Cl.
CPC ............ *B65D 75/5872* (2013.01); *B32B 1/02* (2013.01); *B32B 1/08* (2013.01); *B32B 27/32* (2013.01);
(Continued)

(58) Field of Classification Search
CPC .. B32B 1/02; B32B 1/08; B32B 27/32; B32B 27/327; B65D 75/5811; B65D 75/5822;
(Continued)

(56) References Cited

U.S. PATENT DOCUMENTS 5,221,028 A 6/1993 Dwinell
5,783,638 A 7/1998 Lai et al.
(Continued)

FOREIGN PATENT DOCUMENTS

CA 2095943 C 2/2001
JP 2002104453 A 4/2002
(Continued)

*Primary Examiner* — Walter Aughenbaugh
(74) *Attorney, Agent, or Firm* — Quarles & Brady LLP (57) ABSTRACT

The present disclosure provides a fitment. In an embodiment, the fitment includes a top portion, a base, and a channel extending through the top portion and the base for passage of a flowable material. The fitment is composed of a polymeric composition. The polymeric composition comprises: (i) from 60 weight % to 90 weight % of a propylene-based polymer having a density of 0.900 g/cc and a melt flow rate greater than 10.0 g/10 min; and (ii) from 40 weight % to 10 weight % of a propylene-based plastomer or elastomer ("PBPE") having a density less than 0.900 g/cc, and a melt flow rate (MFR) from 5 g/10 min to 30 g/10 min. The present disclosure also provides a process for sealing multilayer films to the base of the fitment and the resultant flexible container formed from the process.

13 Claims, 3 Drawing Sheets

(51) Int. Cl.
  *B32B 27/32* (2006.01)
  *B65D 81/20* (2006.01)
  *C08L 23/12* (2006.01)
  *C08L 23/14* (2006.01)
  *C08L 23/16* (2006.01)

(52) U.S. Cl.
  CPC ........ *B32B 27/327* (2013.01); *B65D 75/5877* (2013.01); *B65D 75/5883* (2013.01); *B65D 77/068* (2013.01); *B65D 81/203* (2013.01); *C08L 23/12* (2013.01); *C08L 23/142* (2013.01); *C08L 23/16* (2013.01); *B32B 2439/40* (2013.01); *B65D 2575/583* (2013.01); *C08L 2203/10* (2013.01); *C08L 2203/162* (2013.01)

(58) Field of Classification Search
  CPC ............ B65D 75/5861; B65D 75/5866; B65D 75/5872; B65D 77/065; B65D 77/068; B65D 81/203; B65D 75/5883
  See application file for complete search history.

(56) References Cited

U.S. PATENT DOCUMENTS

| | | | |
|---|---|---|---|
| 7,659,343 | B2 | 2/2010 | Wooster et al. |
| 7,863,383 | B2 | 1/2011 | Gibbons et al. |
| 8,609,228 | B2 | 12/2013 | Chen et al. |
| 2015/0328865 | A1 | 11/2015 | Hernandez et al. |

FOREIGN PATENT DOCUMENTS

| | | |
|---|---|---|
| JP | 2006232295 A | 9/2006 |
| WO | 98/008746 A1 | 3/1998 |
| WO | 2007/142720 A1 | 12/2007 |
| WO | 2013/076934 A1 | 5/2013 |
| WO | 2015/062806 A1 | 5/2015 |
| WO | 2015/175117 A1 | 11/2015 |
| WO | 2016/149263 A1 | 9/2016 |
| WO | 2017/058634 A1 | 4/2017 |
| WO | 2017/075022 A1 | 5/2017 |

FITMENT WITH PROPYLENE-BASED BLEND COMPONENT AND FLEXIBLE CONTAINER WITH SAME

BACKGROUND

The present disclosure is directed to a fitment, a process for sealing the fitment to films to produce a flexible container, and the resultant flexible container.

Known are flexible containers (also known as pouches) with fitments. A fitment is a rigid pour spout for delivery of flowable material from the flexible pouch, the fitment sealed to the pouch. Such pouches are often referred to as "pour-pouches."

The rigid fitment is typically made from a material with a higher melt temperature than the pouch seal layer. During the pouch to fitment assembly process, the film surface and the fitment surface are brought into contact by heat seal bars that impart elevated temperature and elevated pressure to the film-fitment assembly. Rigidity in fitments composed of olefin-based polymer, for example, is typically the result of the olefin-based polymer having a high crystallinity. Olefin-based polymer used in rigid fitments typically has a higher melt temperature than olefin-based polymer used in the seal layer of the pouch. Due to the difference in melt temperature, the pouch seal layer can be overheated and deform, and/or the fitment is underheated. Either situation is problematic because each is an impediment to proper, leak-proof, sealing.

A need exists for polymeric formulations for rigid fitments to improve compatibility and seal adhesion with flexible films for the production of pour pouches while maintaining fitment rigidity. A need further exists for improved propylene-based fitments to reduce production costs and production time for the production of propylene-based flexible containers with heat sealed fitments.

SUMMARY

Applicant discovered that addition of a propylene-based elastomeric material to a propylene-based fitment exhibits improvement in fitment to pouch sealability. The propylene-based elastomer/propylene-based polymer blend reduces the melt temperature of the fitment enabling sealability within a desirable melt window of the pouch sealant layer without compromising mechanical properties such as modulus and tensile strength.

The present disclosure provides a fitment. In an embodiment, the fitment includes a top portion, a base, and a channel extending through the top portion and the base for passage of a flowable material. The fitment is composed of a polymeric composition. The polymeric composition comprises: (i) from 60 weight % to 90 weight % of a propylene-based polymer having a density of 0.900 g/cc and a melt flow rate greater than 10.0 g/10 min; and (ii) from 40 weight % to 10 weight % of a propylene-based plastomer or elastomer ("PBPE") having a density less than 0.900 g/cc, and a melt flow rate (MFR) from 5 g/10 min to 30 g/10 min.

The present disclosure provides a process. In an embodiment, the process includes (A) providing a fitment having a top portion, a base, and a channel extending through the top portion and the base. The fitment is composed of a polymeric composition. The polymeric composition includes: (i) from 60 weight % to 90 weight % of a first propylene-based polymer having a density of 0.900 g/cc and a melt flow rate greater than 10.0 g/10 min, and (ii) from 40 weight % to 10 weight % of a propylene-based plastomer or elastomer ("PBPE") having a density less than 0.900 g/cc, and a melt flow rate from 5 g/10 min to 30 g/10 min. The process includes (B) placing the base between two opposing multilayer films. Each multilayer film has a respective seal layer comprising a second propylene-based polymer. The process includes (C) sealing the base to each multilayer film under heat seal conditions; and (D) forming a seal between the fitment and the multilayer films.

The present disclosure provides a flexible container. In an embodiment, the flexible container includes a first multilayer film and a second multilayer film. Each multilayer film comprises a seal layer. The multilayer films are arranged such that the seal layers oppose each other and the second multilayer film is superimposed on the first multilayer film. The flexible container includes a fitment sandwiched between the first multilayer film and the second multilayer film. The fitment has a base. The fitment is composed of a polymeric composition comprising (i) from 60 weight % to 90 weight % of a propylene-based polymer having a density of 0.900 g/cc and a melt flow rate greater than 10.0 g/10 min, and (ii) from 40 weight % to 10 weight % of a propylene-based plastomer or elastomer ("PBPE") having a density less than 0.900 g/cc and a melt flow rate from 5 g/10 min to 30 g/10 min. The base is sealed to the first multilayer film and to the second multilayer film.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all components and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all components and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792, with values reported in grams per cubic centimeter, g/cc.

An "ethylene-based polymer," as used herein, is a polymer that contains more than 50 weight percent polymerized ethylene monomer (based on the total amount of polymerizable monomers) and, optionally, may contain at least one comonomer.

Gel Permeation Chromotography (GPC) is performed using a high temperature triple detector GPC system consisting of a Waters (Milford, MA) 150° C. high temperature chromotograph, equipped with an infra-red detector (IR4 from PolymerChar, Valencia, Spain). Concentration is measured with the infra-red detector. The carrier solvent used is 1,2,4-trichlorobenzene (TCB). The system was equipped with an on-line solvent degas device from Polymer Laboratories. The carousel compartment was operated at 150° C. Four Mixed-A 30 cm, 20 micron columns are used from Polymer Laboratories. The chromatographic solvent (TCB) and the sample preparation solvent contain 200 ppm of butylated hydroxytoluene (BHT) and both solvent sources are nitrogen sparged. The polymer samples are stirred gently at 160° C. for 4 hours prior to injection. The injection volume is 200 ul, and the flow rate is 1.0 ml/minute.

Heat Seal Initiation Temperature is the temperature at which an average peak load greater than 4.448 Newtons (greater than 1 pound) is obtained; average peak load measured in accordance with ASTM F 88.

Mechanical properties (elongation, tensile strength, average-2% modulus, average-ultimate tensile) are measured in accordance with ASTM D 1708 with values reported in pounds per square inch (psi). ASTM D 1708 is based on a test speed of 5 inches per minute (in/min). For average-2% modulus and average-ultimate tensile, five specimens for each material are tested and average numbers are reported.

Melt flow rate (MFR) is measured in accordance with ASTM D 1238, Condition 230° C./2.16 kg (g/10 minutes).

Melt index (MI) is measured in accordance with ASTM D 1238, Condition 190° C./2.16 kg (g/10 minutes).

Melt temperature, or "Tm" as used herein (also referred to as a melting peak in reference to the shape of the plotted DSC curve), is typically measured by the DSC (Differential Scanning calorimetry) technique for measuring the melting points or peaks of polyolefins as described in U.S. Pat. No. 5,783,638, wherein the Tm is the second heat melt temperature taken at a ramp rate of 10° C./min and Tm is largest peak. The heat of fusion (Hf) (measured in Joules/gram, J/g) and the peak melting temperature are reported from the second heat curve. Peak crystallization temperature is determined from the cooling curve. Crystallization temperature, Tc, is determined from the DSC cooling curve as above except the tangent line is drawn on the high temperature side of the crystallization peak. Where this tangent intersects the baseline is the extrapolated onset of crystallization (Tc). It should be noted that many blends comprising two or more polyolefins will have more than one melting point or peak, many individual polyolefins will comprise only one melting point or peak.

An "olefin-based polymer," as used herein is a polymer that contains more than 50 weight percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

DETAILED DESCRIPTION

The present disclosure provides a fitment. The fitment includes a top portion, a base, and a channel. The channel extends through the top portion and the base for passage of a flowable material. The base has a shape when the fitment is viewed from bottom plan view. Nonlimiting examples of suitable shapes for the base (when fitment is viewed from bottom plan view) include circle, ellipse, canoe, polygon, and regular polygon (triangle, square, pentagon, hexagon, heptagon, octagon, etc.).

The fitment is composed of a polymeric composition. The polymeric composition includes (i) from 60 weight % to 90 weight % of a propylene-based polymer. The propylene-based polymer has a density of 0.900 g/cc and a melt flow rate greater than 10.0 g/10 min. The polymeric composition also includes (ii) from 40 weight % to 10 weight % of a propylene-based plastomer or elastomer ("PBPE"). The PBPE has a density less than 0.900 g/cc, and a melt flow rate from 5 g/10 min to 30 g/10 min.

1. Propylene-Based Polymer

The polymeric composition of the fitment includes a propylene-based polymer. A "propylene-based polymer" is a propylene homopolymer or a propylene/$C_2$, $C_{4-8}$ α-olefin copolymer having a density of at least 0.900 g/cc, and/or a melt temperature, Tm, of at least 120° C., or at least 130° C., or at least 140° C., or at least 150° C.

The propylene-based polymer may be a propylene homopolymer or the propylene-based polymer can include propylene and one or more $C_2$ or $C_4$-$C_{20}$ α-olefin, or $C_4$-$C_8$ α-olefin comonomers. The comonomer(s) can be linear or branched. Nonlimiting examples of suitable comonomers include ethylene, 1-butene, 1 pentene, 4-methyl-1-pentene, 1-hexene, and 1-octene. The propylene-based polymer can be prepared with either Ziegler-Natta, chromium-based, constrained geometry or metallocene catalysts in slurry reactors, gas phase reactors or solution reactors. The propylene-based polymer includes at least 50 percent by weight propylene polymerized therein, or at least 70 percent by weight, or at least 80 percent by weight, or at least 85 percent by weight, or at least 90 weight percent, or at least 95 percent by weight propylene in polymerized form.

In an embodiment, the propylene-based polymer is a propylene homopolymer having one, some, or all of the following properties:

(i) a density from 0.900 g/cc to 0.905 g/cc, and/or (ii) melt flow rate (MFR) from 5.0 g/10 min, or 6.0 g/10 min, or 7.0 g/10 min, or 8.0 g/10 min, or 9.0 g/10 min, or 10 g/10 min, or 15 g/10 min to 20 g/10 min, or 30 g/10 min.

In an embodiment, the propylene-based polymer is a propylene homopolymer having a density of 0.900 g/cc and a MFR from 18 g/10 min, or 20 g/10 min to 22 g/10 min.

Nonlimiting examples of suitable propylene homopolymer include F180A, FPT300F, FT120W2, FT120WB2, FT120WV, FT140WV, and FT200WV available from Braskem and Adstif HA5009 and Adstif HA748L available from LyondelBassell.

In an embodiment, the propylene-based polymer is a propylene/ethylene copolymer having one, some, or all of the following properties:

(i) from 1 wt %, or 3 wt %, or 4 wt %, or 5 wt % to 6 wt %, or 7 wt %, or 8 wt %, or 9 wt % to less than 10 wt % ethylene comonomer, and/or (ii) a density from 0.900 g/cc to 0.905; and/or (iii) a melt temperature, Tm, from greater than 120° C., or 130° C. to 140° C., or 150° C.; and/or (iv) a melt flow rate from 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min, or 8 g/10 min, or 15 g/10 min, or 25 g/10 min.

2. Propylene-Based Plastomer Elastomer

The polymeric composition includes a propylene-based plastomer or elastomer ("PBPE"). A "propylene-based plastomer or elastomer" (or "PBPE") comprises at least one copolymer with at least 50 weight percent of units derived from propylene and at least 1 weight percent of units derived from a comonomer other than propylene.

The PBPE is characterized as having substantially isotactic propylene sequences. "Substantially isotactic propylene sequences" means the sequences have an isotactic triad (mm) measured by $^{13}$C NMR of greater than 0.85, or greater than 0.90, or greater than 0.92, or greater than 0.93. Isotactic triads are known in the art and described in, for example, U.S. Pat. No. 5,504,172 and WO 2000/01745, which refer to the isotactic sequence in terms of a triad unit in the copolymer molecular chain determined by $^{13}$C NMR spectra.

The PBPE has a melt flow rate (MFR) in the range of from 0.1 to 25 g/10 minutes (min.), measured in accordance with ASTM D-1238 (at 230° C./2.16 Kg). All individual values and subranges from 0.1 to 25 g/10 min are included and disclosed herein; for example, the MFR can be from a lower limit of 0.1, 0.2, or 0.5, to an upper limit of 25, 15, 10, 8, or 5, g/10 min. For example, when the PBPE is propylene/ethylene copolymer, it may have a MFR in the range of 0.1 to 10, or in the alternative, 0.2 to 10, g/10 min.

The PBPE has a crystallinity in the range of from at least 1 to 30 wt % (a heat of fusion of at least 2 to less than 50 Joules/gram (J/g)), all individual values and subranges thereof being included and disclosed herein. For example, the crystallinity can be from a lower limit of 1, 2.5, or 3 wt % (respectively, at least 2, 4, or 5 J/g) to an upper limit of 30, 24, 15 or 7 wt % (respectively, less than 50, 40, 24.8 or 11 J/g). For example, when the PBPE is propylene/ethylene copolymer, it may have a crystallinity in the range of from at least 1 to 24, 15, 7, or 5 wt % (respectively, at least 2 to less than 40, 24.8, 11, or 8.3 J/g). Crystallinity is measured via DSC method, as described below in the test methods section. The propylene/ethylene copolymer comprises units derived from propylene and polymeric units derived from ethylene comonomer and optional $C_4$-$C_{10}$ α-olefin. Exemplary comonomers are $C_2$, and $C_4$ to $C_{10}$ α-olefins; for example, $C_2$, $C_4$, $C_6$ and $C_8$ α-olefins (ethylene is considered an α-olefin in this disclosure).

In an embodiment, the PBPE comprises from 1 wt % to 40 wt % ethylene comonomer. All individual values and subranges from 1 wt % to 40 wt % are included and disclosed herein; for example, the comonomer content can be from a lower limit of 1, 3, 4, 5, 7 or 9 wt % to an upper limit of 40, 35, 30, 27, 20, 15, 12 or 9 wt %. For example, the propylene/ethylene copolymer comprises from 1 to 35 wt %, or, in alternative, from 1 to 30, or from 3 to 27, or from 3 to 20, or from 3 to 15 wt %, of ethylene comonomer.

In an embodiment, the PBPE has a density from 0.850 g/cc, or 0.860 g/cc, or 0.865 g/cc to less than 0.900 g/cc.

In an embodiment, the PBPE has a molecular weight distribution (MWD), defined as weight average molecular weight divided by number average molecular weight ($M_w/M_n$) of 3.5 or less; in the alternative 3.0 or less; or in another alternative from 1.8 to 3.0.

In an embodiment, the PBPE is further characterized as comprising (A) between 60 and less than 100, between 80 and 99, or between 85 and 99 wt % units derived from propylene, and (B) between greater than 1 and 40 wt %, or between 1 and 20 wt %, or between 4 and 16 wt %, or between 4 and 15 wt % units derived from ethylene and optionally one or more $C_{4-10}$ α-olefin; and containing an average of at least 0.001, at least 0.005, or at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene/ethylene copolymer interpolymer does not exceed 3 long chain branches/1000 total carbons.

The PBPE has a heat of fusion less than 100 J/g and an Mw/Mn less than 3.5. The PBPE has a heat of fusion less than 40 J/g when the ethylene comonomer content is from 10 wt %, or 11 wt %, or 12 wt % to 13 wt %, or 14 wt %, or 15 wt %.

In an embodiment, the PBPE copolymer has a melt temperature (Tm) from 55° C. to less than 120° C.

In an embodiment, the propylene-based plastomer is a propylene/ethylene copolymer with from 3 wt %, or 4 wt %, or 5 wt %, or 6 wt %, or 7 wt % to 8 wt %, or 9 wt %, to less than 10 wt % ethylene comonomer and having one, some, or all of the following properties:

(i) a density from 0.860 g/cc, or 0.865 g/cc, or 0.870/cc, or 0.880 g/cc to 0.885 g/cc, or 0.890, or 0.895, or less than 0.90 g/cc;

(ii) a vicat softening temperature from 60° C., or 61° C., or 62° C. to 63° C., or 64° C., or 65° C.;

(iii) a melt temperature, Tm, from 70° C., or 73° C., or 75° C., or 77° C., or 79° C. to 80° C., or 82° C., or 83° C. to 85° C., or 87° C., or 89° C., or 90° C., or 95° C., or 100° C., or 105° C., or 110° C.; and (iv) a melt flow rate from 0.5 g/10 min, or 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min.

Nonlimiting examples of suitable PBPE include polymers sold under the Tradename VERSIFY available from The Dow Chemical Company such as VERSIFY 3000, 3200, 3401, 4000, and 4301 and polymers sold under the tradename VISTAMAXX available from ExxonMobil Corporation, such as Vistamaxx 3000, 3020FL, 3588FL, 3980FL, 6000 6102, 6102FL, 6202, 6202FL, and 6502.

3. Polymeric Composition

The polymeric composition of the fitment includes from 60 weight percent (w %), or 70 wt %, or 75 wt %, or 80 wt % to 85 wt %, or 90 wt % of the propylene-based polymer and from 40 wt %, or 30 wt %, or 25 wt %, or 20 wt % to 15 wt %, or 10 wt % of the PBPE. Weight percent is based on total weight of the polymeric composition. It is understood that the amount of propylene-based polymer and the reciprocal amount of PBPE yield 100 weight percent. The propylene-based polymer and the PBPE can be any respective propylene-based polymer and PBPE disclosed herein. The propylene-based polymer has a density of at least 0.90 g/cc, or 0.900, a melt temperature, Tm, greater than 120° C., and a melt index from 1 g/10 min to 50 g/10 min. The PBPE has a density from 0.860 g/cc to 0.895, and a Tm less than 120° C.

In an embodiment, the polymeric composition contains from 70 wt % to 80 wt % propylene-based polymer and from 30 wt % to 20 wt % PBPE and has one, some, or all of the following properties:

(i) a density from 0.856, or 0.860, or 0.870, or 0.875 to 0.880, or 0.850, Or 0.890, or 0.895, or 0.896; and/or (ii) an MFR from 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min, or 8 g/10 min, or 15 g/10 min, or 20 g/10 min, or 25 g/10 min; and/or (iii) a Tm from 50° C., or 55° C., or 60° C., or 65° C., or 70° C., or 75° C., or 80° C., or 85° C. to 90° C., or 100° C., or 105° C., or 110° C.

4. Fitment Structure

Figure 1:
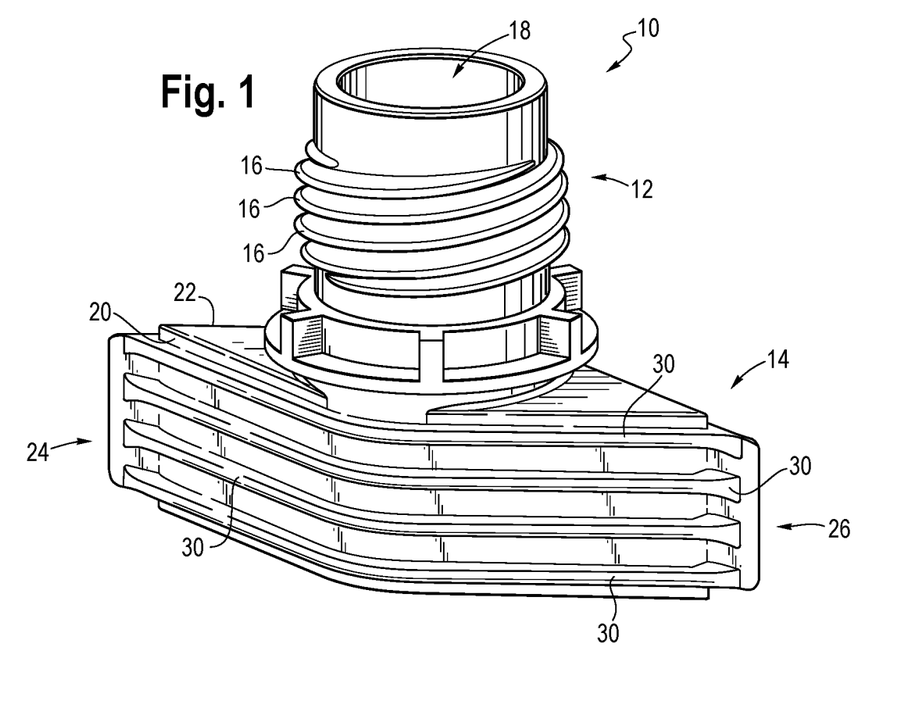
FIG. 1 is a perspective view of a fitment in accordance with an embodiment of the present disclosure.
Figure 2:
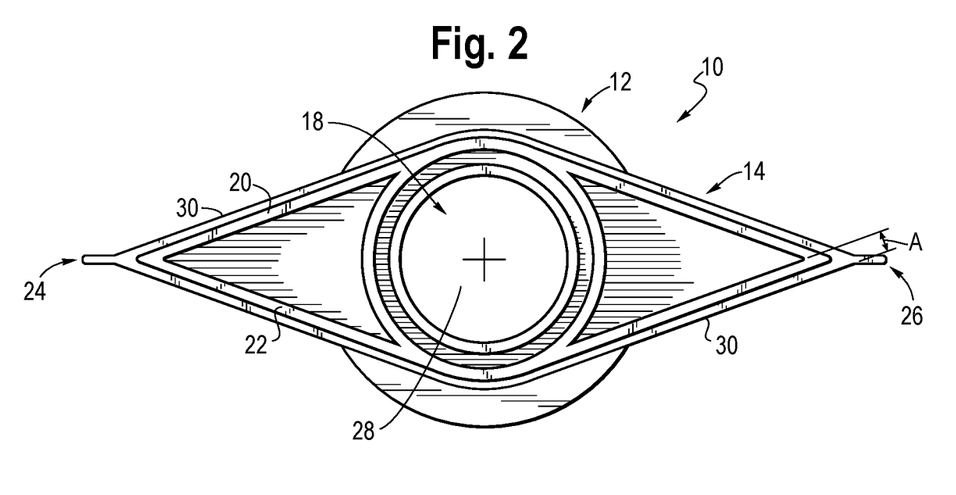
FIG. 2 is bottom plan view of the fitment of FIG. 1.

In an embodiment, a fitment 10 is provided as shown in FIGS. 1-2. The fitment 10 has a top portion 12 and a base 14. The fitment 10 is composed of the polymeric composition. The polymeric composition may be any of the polymeric compositions disclosed above. The base 14 is structured to be placed between opposing flexible films and sealed to form a flexible container as will be discussed in detail below. The top portion 12 may include threads 16, or other structure, for securing a closure to the top portion.

The base 14 includes a pair of opposing sidewalls. Nonlimiting examples of suitable shapes formed by the sidewalls (when the fitment is viewed from bottom plan view) include circle, ellipse, polygon, and regular polygon (triangle, square, pentagon, hexagon, heptagon, octagon, etc.).

A channel 18 extends through the top portion 12 and the base 14. The channel 18 allows a flowable material to pass, or otherwise flow, through the fitment 10.

In an embodiment, the base 14 includes opposing sidewalls 20, 22 that define a canoe-shape (when the fitment is viewed from bottom plan view) as shown in FIG. 2. The sidewalls 20, 22 include the polymeric composition. Sidewalls 20, 22 extend around opposite sides of the channel 18 and join together to form opposing ends 24, 26. When the base 14 of the fitment 10 is sealed between two opposing flexible films, the shape of sidewalls 20, 22 and the shape of the ends 24, 26 allow for a gradual transition from opposing flexible films to a diametrical center 28 of the base 14.

In an embodiment, at least one sealing rib 30 (hereafter "sealing rib(s)") extends along sidewalls 20, 22. The sealing rib(s) 30 includes the polymeric composition.

5. Process

The present disclosure provides a process. In an embodiment, the process includes (A) providing a fitment having a top portion, a base, and a channel extending through the top portion and the base. The fitment is composed of a polymeric composition comprising (i) from 60 weight % to 90 weight % of a first propylene-based polymer having a density of 0.900 g/cc and a melt flow rate greater than 10.0 g/10 min; and (ii) from 40 weight % to 10 weight % of a propylene-based plastomer or elastomer ("PBPE") having a density less than 0.90 g/cc, and a melt flow rate from 5 g/10 min to 30 g/10 min. The process includes (B) placing the base between two opposing multilayer films, each multilayer film having a respective seal layer comprising an olefin-based polymer. The process includes (C) sealing the base to each multilayer film under heat seal conditions. The process includes (D) forming a seal between the fitment and the multilayer films.

Figure 3:
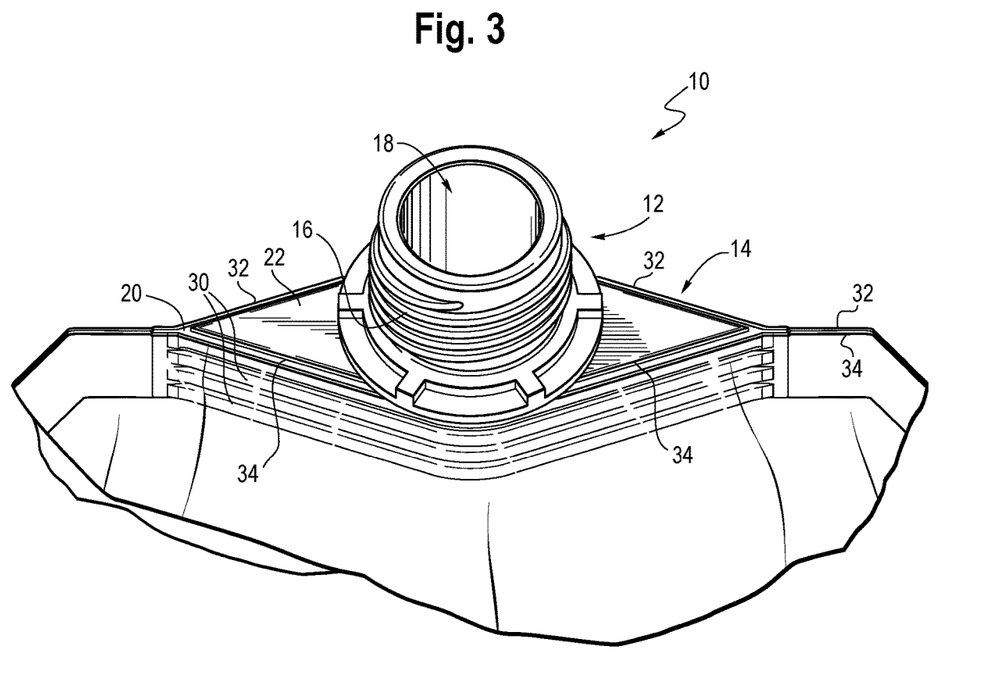
FIG. 3 is a perspective view of the fitment sealed to opposing multilayer films in accordance with an embodiment of the present disclosure.

The process includes placing the fitment base between two opposing multilayer films. The base 12 is placed, or otherwise is positioned, between two opposing multilayer films, multilayer film 32 and multilayer film 34 as shown in FIG. 3. Each multilayer film has a respective seal layer containing an olefin-based polymer.

In an embodiment, each multilayer film is flexible and has at least two, or at least three layers. The flexible multilayer film is resilient, flexible, deformable, and pliable. The structure and composition for each multilayer film may be the same or different. For example, each of two opposing multilayer films can be made from a separate web, each web having a unique structure and/or unique composition, finish, or print. Alternatively, each multilayer film can be the same structure and the same composition.

In an embodiment, each multilayer film 32, 34 is a flexible multilayer film having the same structure and the same composition.

Each flexible multilayer film 32, 34 may be (i) a coextruded multilayer structure or (ii) a laminate, or (iii) a combination of (i) and (ii). In an embodiment, each flexible multilayer film 32, 34 has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

The seal layer is a material capable of sealing the films to each other and capable of sealing to the fitment. Nonlimiting examples of suitable polymeric materials for the seal layer include PBPE (Versify or Vistamaxx), ethylene-based elastomers (AFFINITY™ from the Dow Chemical Company or Exact® from the ExxonMobil Corporation), metallocene linear LLDPE (tradename Exceed) from ExxonMobil Corporation, and tradename Marflex available from Chevron Philips.

Nonlimiting examples of suitable polymeric material for the outer layer include polyethylene terephthalate (PET), biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, PBPE (e.g., VERSIFY™ or VISTAMAX™), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™, blends thereof, and multilayer combinations thereof.

Nonlimiting examples of suitable polymeric materials for the tie layer include liquid laminating adhesive (Adcote from the Dow Chemical Company), extrudable maleic anhydrite grafted tie resins (AMPLIFY TY from The Dow Chemical Company), and functional polyolefins such as ethyl or methyl or butyl acrylate or vinyl acetate containing polyolefins.

The flexible multilayer film may include additional layers which may contribute to the structural integrity or provide specific properties. The additional layers may be added by direct coextrusion or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include polyamide polymers, ethylene vinyl alcohol or polyvinylidene chloride (PVDC).

The process includes sealing the base to each multilayer film under heat seal conditions. The term "heat seal conditions," as used herein, is the act of placing two or more films of polymeric material between opposing heat seal bars, the heat seal bars moved toward each other, sandwiching the films, to apply heat and pressure to the films such that opposing interior surfaces (seal layers) of the films contact, melt, and form a heat seal, or weld, to attach the films to each other. Heat sealing includes suitable structure and mechanism to move the seal bars toward and away from each other in order to perform the heat sealing procedure.

The base 12 is located, or otherwise is "sandwiched," between multilayer film 32 and the multilayer film 34 under heat seal conditions. The film-base-film sandwich is placed between heat seal bars which conform to the canoe-shaped base.

The compression force and heat imparted by the opposing seal bars (i) compress the seal layer of each multilayer film 32, 34 against the outer surface of the base 12; (ii) form a seal that welds base 12 to each of films 32 and 34 and welds films 32 and 34 to each other.

The polymeric composition of the fitment is a heterogeneous composition wherein the propylene-based polymer is the continuous phase with the discontinuous phase of the PBPE dispersed therein. Bounded by no particular theory, it is believed the PBPE discontinuous phase softens and melts first during the heat sealing. The melted discontinuous phase functions to wet and entangle the sealing interface during heat sealing to provide a lower heat seal initiation temperature which increases production efficiencies and yields a stronger seal.

6. Flexible Container

The process includes forming a flexible container. In an embodiment, the flexible container includes a first multilayer film and a second multilayer film, each multilayer film comprising a seal layer. The multilayer films are arranged such that the seal layers oppose each other and the second multilayer film is superimposed on the first multilayer film. The flexible container includes a fitment sandwiched between the first multilayer film and the second multilayer film, the fitment having a base. The fitment is composed of the polymeric composition. The polymeric composition includes (i) from 60 weight % to 90 weight % of a first propylene-based polymer having a density of 0.900 g/cc and a melt flow rate greater than 10.0 g/10 min, and (ii) from 40 weight % to 10 weight % of a propylene-based plastomer or elastomer ("PBPE") having a density less than 0.90 g/cc, and a melt flow rate from 5 g/10 min to 30 g/10 min. The base is sealed to the first multilayer film and to the second multilayer film.

Figure 4:
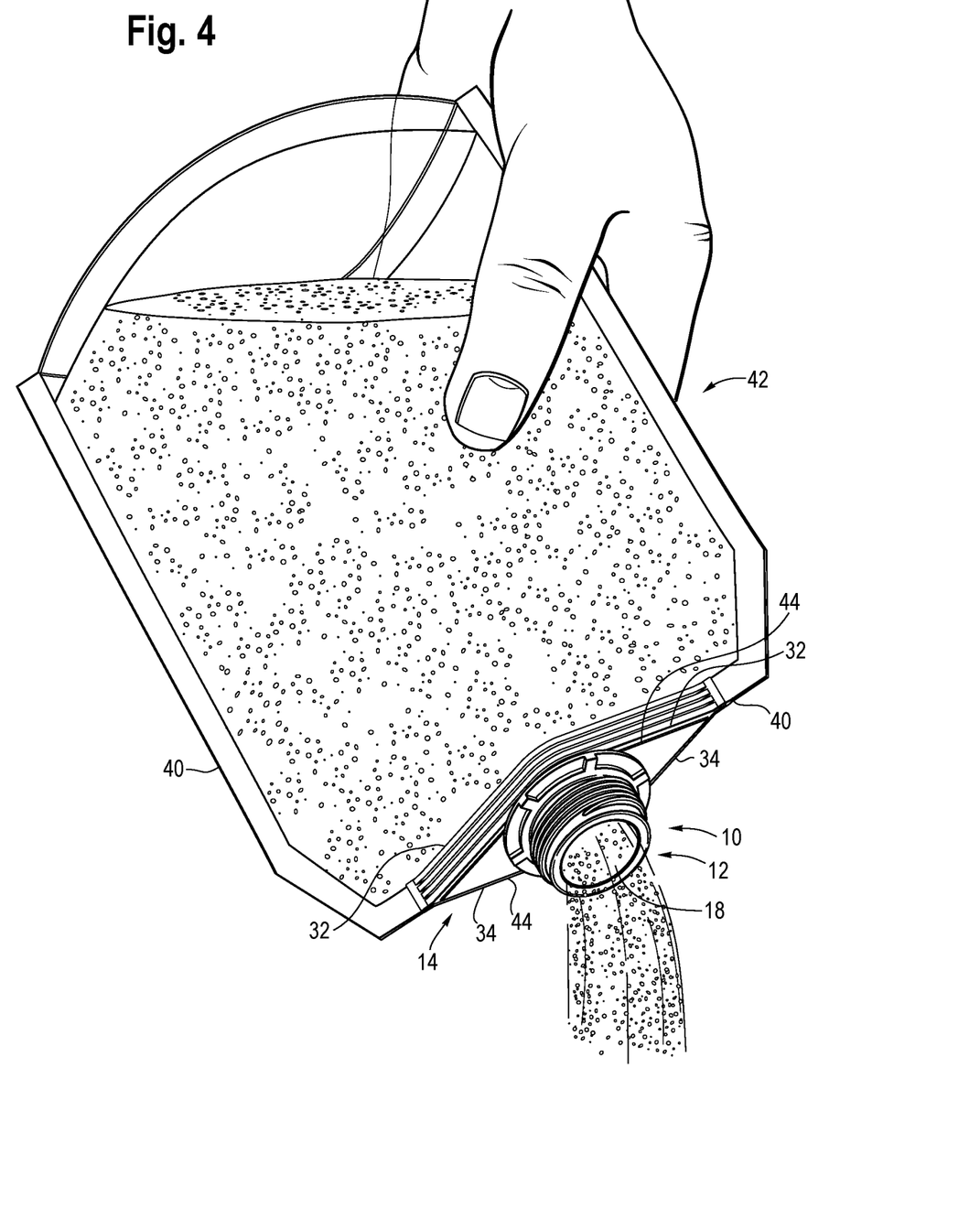
FIG. 4 is a perspective view of a flexible pouch in accordance with an embodiment of the present disclosure.

The opposing multilayer films 32, 34 are superimposed on each other and form a common peripheral edge 40 as shown in FIG. 4. The process includes sealing the multilayer films 32, 34 along the common peripheral edge and forming a flexible container 42. Formation of the seal along the common peripheral edge 40 can occur before, during or after, the heat sealing for the fitment. The process forms a hermetic seal 44 between the base 12 and the multilayer films 32 and 34. A hermetic seal indicates package integrity (no leaks in the seals). Hermiticity testing for enclosures made with such hermetic seals show no bubbles present in the test result.

By way of example, and not limitation, examples of the present disclosure are provided.

EXAMPLES

1. Materials

Materials for polymeric compositions for making fitments are provided in Table 1 below. The source for each product in Table 1 is The Dow Chemical Company.

TABLE 1

| Material | Description | MFR | Density | Melting Point, Tm ° C. |
|---|---|---|---|---|
| 5120H-PP random copolymer | Propylene/ethylene copolymer | 20 | 0.9 | — |
| 1112-PP homopolymer | Propylene-based polymer (propylene homopolymer) | 12 | 0.9 | — |
| Versify 4000 | PBPE- Propylene/ethylene copolymer | 25 | 0.876 | 84 |

TABLE 1-continued

| Material | Description | MFR | Density | Melting Point, Tm ° C. |
|---|---|---|---|---|
| Versify 4301 | PBPE-Propylene/ethylene copolymer | 25 | 0.868 | 64 |
| Versify 3000 | PBPE-Propylene/ethylene copolymer | 8 | 0.891 | 108 |
| Versify 3200 | PBPE-Propylene/ethylene copolymer | 8 | 0.876 | 85 |
| Versify 3401 | PBPE-Propylene/ethylene copolymer | 8 | 0.865 | 55 |

2. Plaques Made of Present Polymeric Composition

Pellets of propylene-based polymer and PBPE from Table 1 are dry blended at various blend levels via a twin screw compounding apparatus to make the samples of the present polymeric composition. The control samples and the polymeric compositions are then injection molded into 10.16 cm (4 in)×15.24 cm (6 in)×0.158 cm (1/16 in) plaques using a Krauss Maffei Injection Molder. The mechanical properties of the plaques are provided in Tables 2A, 2B below.

3. Fitmemt-to-Film Seal Tests

The plaques of the polymeric composition are sealed to a two-layer coextruded film to replicate the fitment-to-multi-layer film seal in a flexible container, such as the fitment seal and flexible container shown in FIGS. 1-4. The dimensions for the two-layer film are 1 in×4 in and the two-layer film is 2 mil thick. The outer layer of the two-layer film is composed of 100 wt % (based on total weight of the outer layer) propylene homopolymer and the seal layer of the two-layer film is composed of 100 wt % (based on total weight of the seal layer) of a PBPE, Versify 2200. The outer layer is present at 80 vol % and the seal layer is present at 20 vol % for the two-layer film.

The plaques are sealed to the sealant layer (Versify 2200) of the two-layer film to replicate fitment-to-seal layer seals and under the heat seal conditions of 344.7 kilopascal (kPa), (50 psi) for 0.5 seconds at temperatures ranging from 140-220° C. with 10 degree increments in accordance with ASTM F88. Heat seal strength is reported as average peak load (in Newtons) for each respective temperature.

TABLE 2A

| | | Plaques Mechanical Properties Tensile Testing | | | | | | | | |
|---|---|---|---|---|---|---|---|---|---|---|
| Result | Units | 100% 5120H control | 90% 5120H + 10% Versify 4200 | 80% 5120H + 20% Versify 4200 | 70% 5120H + 30% Versify 4200 | 60% 5120H + 40% Versify 4200 | 90% 5120H + 10% Versify 4301 | 80% 5120H + 20% Versify 4301 | 70% 5120H + 30% Versify 4301 | 60% 5120H + 40% Versify 4301 |
| Avg-2% Modulus | Psi | 1508.957 | 1375.195 | 1307.768 | 1102.15 | 966.95 | 1329.351 | 1160.747 | 905.006 | 758.499 |
| Avg-Ultimate Tensile | Psi | 3858.221 | 3347.213 | 3190.764 | 3579.623 | 3338.836 | 3212.014 | 3095.99 | 3352.583 | 3090.731 |

TABLE 2B

| | | Mechanical Properties | | | | | | |
|---|---|---|---|---|---|---|---|---|
| Result | Units | 100% 1112 control | 90% 1112 + 10% Versify 3000 | 80% 1112 + 20% Versify 3000 | 70% 1112 + 30% Versify 3000 | 60% 1112 + 40% Versify 3000 | 90% 1112 + 10% Versify 3401 | 80% 1112 + 20% Versify 3401 |
| Avg-2% Modulus | psi | 2802.719 | 2533.291 | 2654.307 | 2407.713 | 2119.876 | 2259.034 | 1803.535 |
| Avg-Ultimate Tensile | psi | 5078.622 | 5333.663 | 5278.985 | 5042.082 | 4695.396 | 4423.959 | 3746.815 |

| Result | 70% 1112 + 30% Versify 3401 | 60% 1112 + 40% Versify 3401 | 90% 1112 + 10% Versify 3200 | 80% 1112 + 20% Versify 3200 | 70% 1112 + 30% Versify 3200 | 60% 1112 + 40% Versify 3200 |
|---|---|---|---|---|---|---|
| Avg-2% Modulus | 1421.897 | 1339.539 | 2376.36 | 1856.356 | 1721.236 | 1241.809 |
| Avg-Ultimate Tensile | 3109.013 | 2855.255 | 4760.069 | 3973.535 | 3981.148 | 3690.097 |

TABLE 3A

Heat Seal testing, blends with propylene/ethylene copolymer and PBPE-Average Peak Load (Newtons, (N)):

| Run No. | Seal temp. (C.) | 100% 5120H control* | 90% 5120H + 10% Versify 4200 | 80% 5120H + 20% Versify 4200 | 70% 5120H + 30% Versify 4200 | 60% 5120H + 40% Versify 4200 | 90% 5120H + 10% Versify 4301 | 80% 5120H + 20% Versify 4301 | 70% 5120H + 30% Versify 4301 |
|---|---|---|---|---|---|---|---|---|---|
| 1 | 140 | 0.151239 | 0.169032 | 0.128998 | 0.164584 | 0.151239 | 0.146791 | 0.146791 | 0.155688 |
| 2 | 150 | 0.12455 | 0.169032 | 0.44927 | 0.133447 | 1.29888 | 0.57382 | 0.702819 | 1.045332 |
| 3 | 160 | 1.908286 | 3.807676 | 4.381497 | 4.532736 | 5.769341 | 6.908086 | 6.174129 | 15.14619 |
| 4 | 170 | 19.89244 | 20.02144 | 17.51709 | 16.07142 | 23.96256 | 23.39764 | 25.51499 | 35.09201 |
| 5 | 180 | 40.3498 | 39.2333 | 34.83846 | 42.65843 | 40.57666 | 37.50294 | 39.17547 | 41.68427 |
| 6 | 190 | 40.55442 | 37.44956 | 40.16743 | 43.1077 | 43.95731 | 38.41483 | 40.13629 | 39.16658 |
| 7 | 200 | 24.32287 | 25.71961 | 31.20871 | 27.02294 | 25.32372 | 27.24535 | 33.80647 | 32.66773 |
| 8 | 210 | 18.69142 | 24.54973 | 23.49105 | 33.42837 | 36.86685 | 31.51564 | 37.18712 | 37.57856 |
| 9 | 220 | 20.65753 | 28.2284 | 30.47031 | 33.38389 | 19.28303 | 24.741 | 28.38409 | 26.95621 |
| 10 | 230 | 30.02549 | 25.35041 | 22.83716 | 26.52918 | 17.05448 | 4.893042 | 22.75265 | 18.68697 |

*comparative sample

TABLE 3B

Heat Seal testing, blends with propylene homopolymer and PBPE-Average Peak Load (N)

| Run No. | Seal temp. (C.) | 100% 1112 control* | 90% 1112 + 10% Versify 3000 | 80% 1112 + 20% Versify 3000 | 70% 1112 + 30% Versify 3000 | 60% 1112 + 40% Versify 3000 | 90% 1112 + 10% Versify 3401 | 80% 1112 + 20% Versify 3401 |
|---|---|---|---|---|---|---|---|---|
| 11 | 140 | 0.209066 | 0.115654 | 0.128998 | 0.191273 | 0.182377 | 0.20017 | 0.155688 |
| 12 | 150 | 0.177929 | 0.440374 | 0.12455 | 0.151239 | 0.209066 | 0.128998 | 0.271341 |
| 13 | 160 | 0.289134 | 0.160136 | 0.177929 | 0.177929 | 0.662785 | 0.177929 | 0.146791 |
| 14 | 170 | 0.137895 | 0.177929 | 0.658337 | 19.73675 | 16.45397 | 33.64634 | 35.99055 |
| 15 | 180 | 17.84681 | 32.73 | 42.24919 | 41.25724 | 8.04323 | 44.94926 | 37.31167 |
| 16 | 190 | 40.07846 | 33.66858 | 13.33132 | 31.68912 | 27.66793 | 29.30043 | 36.55102 |
| 17 | 200 | 46.79527 | 40.20301 | 32.89014 | 40.62115 | 19.81237 | 41.46631 | 41.75989 |
| 18 | 210 | 42.12464 | 43.77938 | 43.25449 | 25.78188 | 31.63129 | 44.40213 | 38.27693 |
| 19 | 220 | 40.71011 | 37.45846 | 41.54637 | 35.81262 | 36.46651 | 41.39514 | 35.04753 |
| 20 | 230 | 42.80522 | 33.06807 | 37.50739 | 29.73635 | 41.02148 | 39.25999 | 40.64783 |

| Run No. | 70% 1112 + 30% Versify 3401 | 60% 1112 + 40% Versify 3401 | 90% b1112 + 10% Versify 3200 | 80% 1112 + 20% Versify 3200 | 70% 1112 + 30% Versify 3200 | 60% 1112 + 40% Versify 3200 |
|---|---|---|---|---|---|---|
| 11 | 0.235756 | 0.053379 | 0.026689 | 0.128998 | 0.07562 | 0.093413 |
| 12 | 0.333617 | 0.066723 | 0.044482 | 0.04893 | 0.080068 | 0.084516 |
| 13 | 0.128998 | 0.52489 | 0.053379 | 1.712565 | 0.658337 | 3.176029 |
| 14 | 29.9988 | 32.1206 | 7.286184 | 23.11295 | 28.33516 | 33.90878 |
| 15 | 40.31867 | 23.10405 | 7.677628 | 45.93677 | 39.80712 | 37.00029 |
| 16 | 40.14519 | 39.34006 | 41.50189 | 43.80607 | 42.49829 | 41.92447 |
| 17 | 37.3517 | 36.80012 | 43.08991 | 40.54553 | 39.69592 | 38.70841 |
| 18 | 37.79653 | 41.44407 | 33.27269 | 36.4754 | 37.92997 | 32.94797 |
| 19 | 38.49045 | 38.36145 | 26.24895 | 29.95431 | 39.47795 | 40.45656 |
| 20 | 36.67113 | 27.93927 | 38.6061 | 42.76074 | 36.91578 | 44.62009 |

*comparative sample

7. Results

Fitments composed of polymeric compositions containing 10 wt % to 40 wt % PBPE and 90 wt % to 60 wt % propylene/ethylene copolymer show a 10° C. decrease in heat seal initiation temperature (HSIT) as opposed to control sample fitments made with 100 wt % propylene/ethylene copolymer. HSIT is the temperature where an average peak load greater than 4.448N (1 lb) is obtained. Table 3A shows that control 5120H (comparative sample) requires 170° C. to achieve an average peak load greater than 4.448 N, whereas the present polymeric composition achieves an average peak load greater than 4.448 N at 160° C. (10° C. lower HSIT than control) with no degradation in tensile performance.

Fitments composed of polymeric compositions containing 10 wt % to 40% wt % PBPE and 90 wt % to 60 wt % propylene homopolymer show a 10° C. decrease in HSIT as opposed to control sample fitments made with 100 wt % propylene homopolymer. Table 3B shows that control 1112H (comparative sample) requires 180° C. to achieve an average peak load greater than 4.448 N, whereas the present polymeric composition achieves an average peak load greater than 4.448 N at 170° C. (10° C. lower HSIT than control) with no degradation in tensile performance.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A fitment comprising:
a top portion, a base, and a channel extending through the top portion and the base for passage of a flowable material;
the fitment composed of a polymeric composition comprising:
(i) from 60 weight % to 90 weight % of a propylene-based polymer having a density of 0.900 g/cc and a melt flow rate greater than 10.0 g/10 min; and
(ii) from 40 weight % to 10 weight % of a propylene-based plastomer or elastomer ("PBPE") having a density less than 0.900 g/cc, and a melt flow rate (MFR) from 5 g/10 min to 30 g/10 min.

2. The fitment of claim 1 wherein the polymeric composition has a density from 0.856 g/cc to 0.896 g/cc and an MFR from 1 g/10 min to 30 g/10 min.

3. The fitment of claim 1 wherein the propylene-based polymer is selected from the group consisting of propylene/ethylene copolymer and propylene homopolymer.

4. The fitment of claim 1 wherein the propylene-based polymer is a propylene/ethylene copolymer having an MFR from 20 g/10 min to 25 g/10 min; and
the PBPE has a density from 0.860 g/cc to 0.890 g/cc and a MFR from 20 g/10 min to 30 g/10 min.

5. The fitment of claim 1 wherein the propylene-based polymer is a propylene homopolymer having an MFR from greater than 10 g/10 min to 15 g/10 min; and the PBPE has an MFR from 5 g/10 min to less than 10 g/10 min.

6. A process comprising:
A. providing a fitment having a top portion, a base, and a channel extending through the top portion and the base, the fitment composed of a polymeric composition comprising:
(i) from 60 weight % to 90 weight % of a first propylene-based polymer having a density of 0.900 g/cc and a melt flow rate greater than 10.0 g/10 min, and from 40 weight % to 10 weight % of a propylene-based plastomer or elastomer ("PBPE") having a density less than 0.900 g/cc, and a melt flow rate from 5 g/10 min to 30 g/10 min;
B. placing the base between two opposing multilayer films, each multilayer film having a respective seal layer comprising a second propylene-based polymer;
C. sealing the base to each multilayer film under heat seal conditions; and
D. forming a seal between the fitment and the multilayer films.

7. The process of claim 6 comprising forming a hermetic seal.

8. The process of claim 6 wherein the heat seal conditions comprise a seal bar pressure of 344.7 kPa at 210° C. and a dwell time of 0.5 seconds, the process comprising
providing the polymeric composition comprising (i) from 60 wt % to 90 wt % of the first propylene-based polymer that is a propylene/ethylene copolymer having an MFR from 20 g/10 min to 25 g/10 min, and (ii) from 40 wt % to 10 wt % of the PBPE having a density from 0.860 g/cc to 0.890 g/cc and a MFR from 20 g/10 min to 30 g/10 min; and
forming a seal between the fitment and the multilayer films, the seal having an average peak load greater than 2.27 kg.

9. The process of claim 6 wherein the heat seal conditions comprise a seal bar pressure of 344.7 kPa at 170° C. and a dwell time of 0.5 seconds, the process comprising
providing the polymeric composition comprising (i) from 60 wt % to 90 wt % of the first propylene-based polymer that is a propylene homopolymer having an MFR from greater than 10 g/10 min to 15 g/10 min, and (ii) from 40 wt % to 10 wt % of the PBPE having an MFR from 5 g/10 min to less than 10 g/10 min, and
forming a seal between the fitment and the multilayer films, the seal having an average peak load greater than 0.0454 kg.

10. A flexible container comprising:
a first multilayer film and a second multilayer film, each multilayer film comprising a seal layer, the multilayer films arranged such that the seal layers oppose each other and the second multilayer film is superimposed on the first multilayer film;
a fitment sandwiched between the first multilayer film and the second multilayer film, the fitment having a base, the fitment composed of a polymeric composition comprising
(i) from 60 weight % to 90 weight % of a propylene-based polymer having a density of 0.900 g/cc and a melt flow rate greater than 10.0 g/10 min, and
(ii) from 40 weight % to 10 weight % of a propylene-based plastomer or elastomer ("PBPE") having a density less than 0.900 g/cc and a melt flow rate from 5 g/10 min to 30 g/10 min.; and
the base is sealed to the first multilayer film and to the second multilayer film.

11. The flexible container of claim 10 wherein the fitment comprises
a top portion; and
a channel extending through the top portion and the base, the channel for passage of a flowable material.

12. The flexible container of claim 10 wherein the first multilayer film and the second multilayer film are sealed along a common peripheral edge; and
the base is sealed to the first multilayer film and to the second multilayer film along a portion of the common peripheral edge.

13. The flexible container of claim 10 wherein the base sealed to the multilayer films is a base seal, and the base seal is a hermetic seal.

* * * * *